Aug. 12, 1941.　　　　E. A. SPERRY, JR　　　　2,252,420
FLOAT
Filed Jan. 5, 1938

INVENTOR
ELMER A. SPERRY JR.
BY
*Joseph H. Lipschutz*
ATTORNEY

Patented Aug. 12, 1941

2,252,420

UNITED STATES PATENT OFFICE 2,252,420

FLOAT

Elmer A. Sperry, Jr., Brooklyn, N. Y., assignor to Sperry Products, Inc., Brooklyn, N. Y., a corporation of New York Application January 5, 1938, Serial No. 183,550

7 Claims. (Cl. 33—223)

This invention relates to float elements such as are employed in various indicating instruments, such as magnetic compasses, and applies also generally to any case wherein a float element is supported against a pivot so that buoyancy affects pivot load. In the case of indicating instruments, such as magnetic compasses, it is desirable that the float element shall have a large moment of inertia in order to obtain slow periods and therefore a minimum of responsiveness to incidental disturbing forces. Heretofore, the method employed to obtain the large moment of inertia for the float element has been to make the float of relatively large fluid displacement. One undesirable result of this construction arose from the fact that temperature change in the liquid in which the float was immersed varied the buoyancy of the float so that with substantial change in temperature, the pivot pressure with which the float rested against its pivot was in some instances increased many times. This increase in pressure, especially in the case of sensitive responsive instruments such as magnetic compasses, was frequently sufficient to cause the float element to stick against the pivot so that the float element was rendered unresponsive, and therefore the instrument ceased to function properly. In order to overcome this difficulty, it has been proposed to employ various heating arrangements, but these are complicated and difficult to apply with any degree of accuracy.

It is the principal object of my invention, therefore, to provide a float element which will have a maximum moment of inertia with a minimum fluid displacement and therefore a minimum variation in pivot pressure due to change of temperature of the surrounding fluid.

Other objects and advantages of this invention will become apparent in the following detailed description thereof.

In the accompanying drawing.

Figure 1:
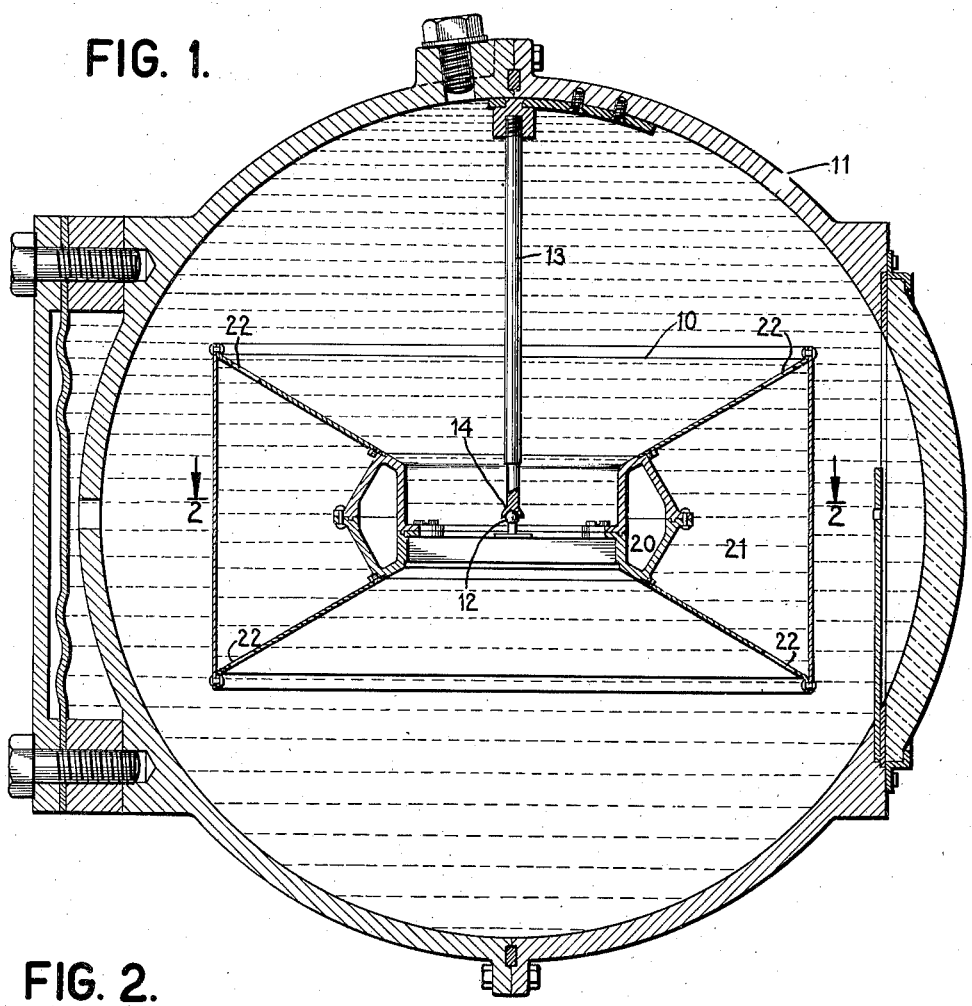
Fig. 1 is a vertical section through a float element embodying my invention, and its enclosing casing.
Figure 2:
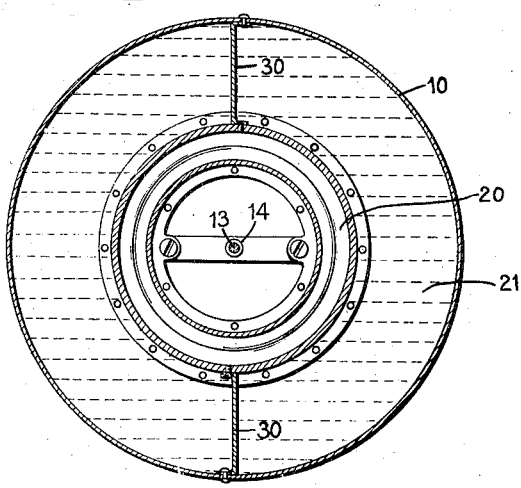
Fig. 2 is a section taken substantially on the line 2—2 of Fig. 1.

Referring to the drawing, there is shown a float element 10 supported within a casing 11 by a pivot 12 resting against a pivot post 13 supported from the casing. The casing 11 is filled with fluid within which floats the float element 10, said element being designed to have sufficient displacement to give an upward movement to the float so that the pivot 12 bears against the lower end 14 of pivot post 13. The float 10 may be the sensitive element of an indicating instrument such as an artificial horizon or a magnetic compass. In such instrument, it will be understood, it is desirable to obtain as long a period of oscillation of the float element as possible in response to disturbing forces so that short-period disturbances will not appreciably affect the action of the float element 10, but forces of long duration, that is, of long period, will cause the said float to respond. In order to obtain this desirable result, the float is made of as large a mass as possible in order to increase the moment of inertia thereof. It will be seen that the float element is made as large as casing 11 will permit, leaving only enough clearance so as not to set up swirl in the liquid.

Figure 3:
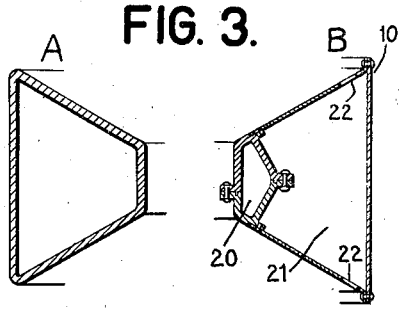
Fig. 3 shows two cross sections through old and new float members showing relative displacement volumes.

Referring to Fig. 3, there is shown in diagram A a cross-section of a float such as heretofore employed, in which it will be seen that the entire section of said float was sealed against the fluid so as to render the entire float buoyant. This provided a large displacement with consequent large buoyancy which permitted the use of a heavy float. Such heaviness of the float was in fact necessary because the sealed chamber of such large cross-section acted like a diaphragm and was easily affected by variations in pressure thereon, so that in order to prevent buckling, relatively thick walls had to be employed. This made for a heavy float which was overcome by the large buoyancy caused by the large displacement due to the fact that the entire cross-section A was sealed against fluid. With temperature change, however, it was found that a float of such large displacement varied its buoyancy appreciably and hence varied the pressure with which pivot 12 bore against the pivotal seat 14 to such extent as in fact to render the instrument, if a compass or artificial horizon, insufficiently responsive. Some idea of the relative values may be obtained when it is stated that a float, such as cross-section A, of 350 cc., for a 50° C. drop in temperature changes its buoyancy to cause an increase in the pressure of pivot 12 against seat 14 of 3.50 gms. for water and 14 gms. for a selected anti-freeze liquid. Such a pivotal pressure was sufficient to render the mechanism insufficiently responsive.

In order to overcome the difficulty described hereinbefore, I have devised a float element which provides the necessary moment of inertia of the old type float element, while at the same time eliminating the wide variation in pivot pressure caused by temperature change acting upon a float of large displacement. For this purpose I have designed the float section shown in diagram B of Fig. 3 wherein it will be seen that the float element comprises an inner sealed portion 20 and an outer portion 21 which is substantially enclosed except for a plurality of relatively small openings 22 which permit the fluid to pass into and out of the portion 21 of the float element. It will now be seen that the float element consists of a buoyant portion 20 and a portion 21 which is not buoyant and therefore does not add appreciably to the displacement volume of the float. The total displacement volume of the float is that of sealed portion 20 plus the displacement of the thickness of the sheet metal of the remainder of the float. Thus the float of section B has a total displacement of some 50 cc. as compared to a displacement of 350 cc. of float A. This means that in the case cited above for a 50° C. drop in temperature, whereas float A will cause an increase in pivot pressure of 3.50 gms. for water and 14 gms. for a selected anti-freeze liquid, float B will cause an increase in pivot pressure of .50 gm. for water and only 2 gms. for the same anti-freeze liquid. Further, it will be realized that this diminution in change of pivot pressure with change of temperature is accomplished without sacrificing any part of the large moment of inertia which is necessary to render the instrument unresponsive to short period impulses. This is for the reason that the fluid fills portion 21 wherein it is trapped so that the said portion 21, with the weight of fluid therein concentrated in the outside portion of the float element 10, gives a large moment of inertia in excess of that obtained with the old cross-section A. Thus, I have devised a float which has the very desirable properties of maximum moment of inertia with minimum change in pivot pressure for change in temperature.

Unlike the portion 20 which has air on one side and fluid pressure on the other and must therefore be made of material sufficiently rigid to withstand the difference in pressure, the portion 21 has liquid on both sides thereof and therefore is not subjected to any differential pressure. The walls of portion 21 may therefore be made of thinner material.

Since the rotation of the float element around the vertical axis may have a tendency to cause the body of liquid in portion 21 to lag behind the movements of the float and thus tend to nullify the effect of large moment of inertia of the float element, one or more baffles or partitions 30 are provided in portion 21. Said baffles or partitions may completely subdivide the said portion so that the liquid therein cannot move as a body relative to the float.

It will be noted in Fig. 3 that certain of the openings 22 are located close to the extreme upper portion of the chamber 21. This will serve the purpose of permitting liquid to enter and leave in response to temperature variations. By this construction, a quick interchange of liquid in response to temperature change is made possible so that the liquid in the outer chamber will not become either top-heavy or bottom-heavy and act like an erect or inverted pendulum.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device of the character described, a container having liquid therein, a pivot post supported by said container, a float adapted to be immersed in said liquid and having a pivot adapted to engage said post, said float comprising a sealed buoyant chamber and a substantially closed chamber filled with said liquid.

2. In a device of the character described, a container having liquid therein, a pivot post supported by said container, a float adapted to be immersed in said liquid and having a pivot adapted to engage said post, said float comprising a sealed buoyant chamber and a substantially closed chamber filled with said liquid, said last named chamber having openings permitting said liquid to pass into and out of the same.

3. In a device of the character described, a container having liquid therein, a pivot post supported by said container, a float adapted to be immersed in said liquid and having a pivot adapted to engage said post, said float comprising an inner sealed buoyant chamber and a substantially closed outer chamber filled with said liquid.

4. In a device of the character described, a container having liquid therein, a pivot post supported by said container, a float adapted to be immersed in said liquid and having a pivot adapted to engage said post, said float comprising an inner sealed buoyant chamber and a substantially closed outer chamber filled with said liquid and surrounding said buoyant chamber.

5. In a device of the character described, a container having liquid therein, a pivot post supported by said container, a float adapted to be immersed in said liquid and having a pivot adapted to engage said post, said float comprising a sealed buoyant chamber and a substantially closed chamber filled with said liquid, said last-named chamber having baffle means therein positioned so as to oppose any tendency of the liquid to move relative to said last-named chamber when said float moves around a vertical axis.

6. In a device of the character described, a container having liquid therein, a pivot post supported by said container, a float adapted to be immersed in said liquid and having a pivot adapted to engage said post, said float comprising a sealed buoyant chamber and a substantially closed chamber filled with said liquid, said last-named chamber having partitions therein positioned so as to oppose any tendency of the liquid to move relative to said last-named chamber when said float moves around a vertical axis.

7. In a device of the character described, a container having liquid therein, a pivot post supported by said container, a float adapted to be immersed in said liquid and having a pivot adapted to engage said post, said float comprising a sealed buoyant chamber and a substantially closed chamber filled with said liquid, said last-named chamber having a plurality of openings near the extreme upper portion thereof.

ELMER A. SPERRY, Jr.